Jan. 21, 1958   L. R. JONES ET AL   2,820,852
DICTATION SYSTEM
Filed Sept. 20, 1954   5 Sheets—Sheet 1

INVENTORS
Lloyd R. Jones
Douglas E. Taylor
BY
Curtis Morris & Safford
ATTORNEYS

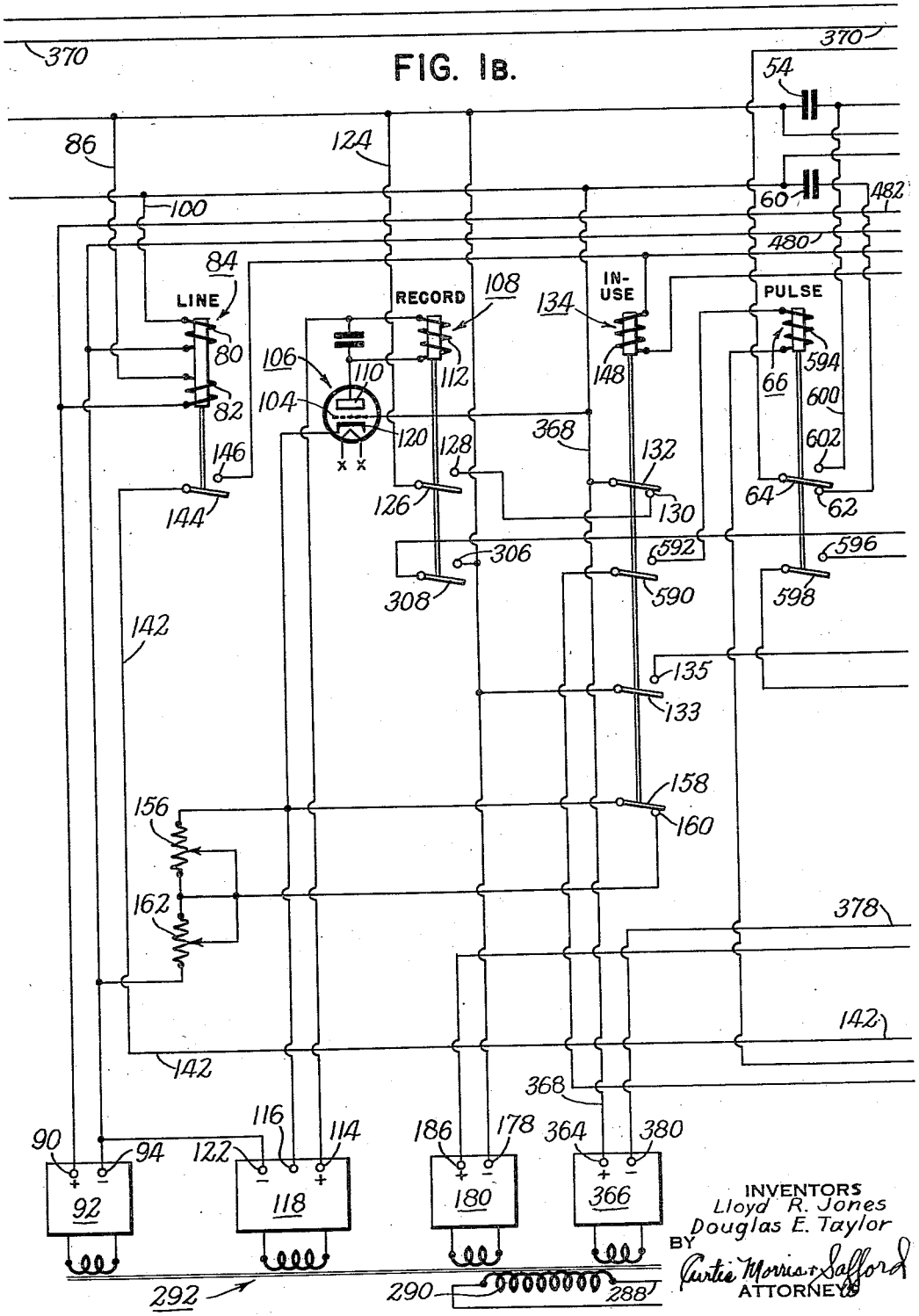
Jan. 21, 1958
L. R. JONES ET AL
2,820,852
DICTATION SYSTEM
Filed Sept. 20, 1954
5 Sheets-Sheet 2
FIG. IB.
INVENTORS
Lloyd R. Jones
Douglas E. Taylor
BY
Curtis, Morris & Safford
ATTORNEYS

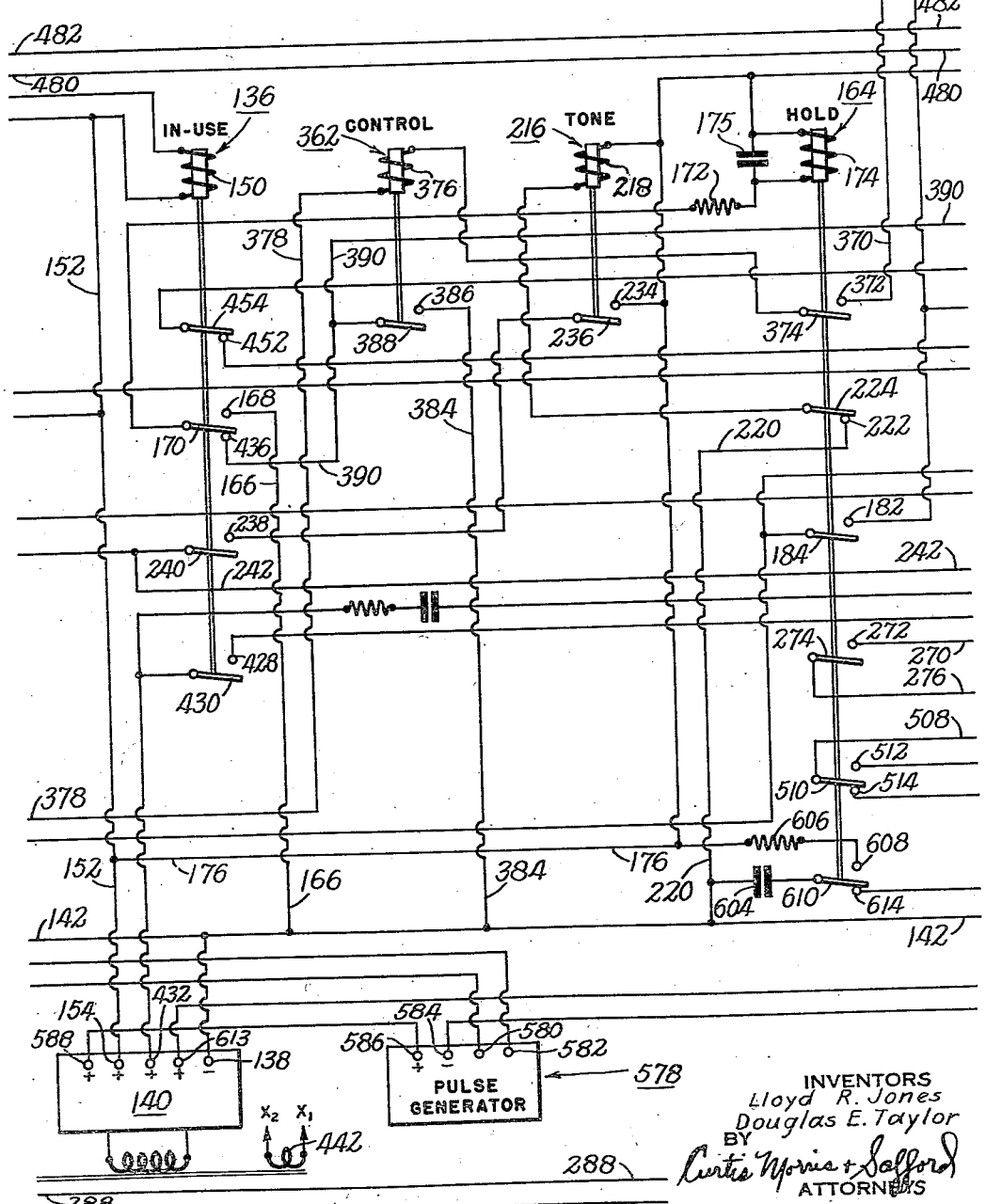

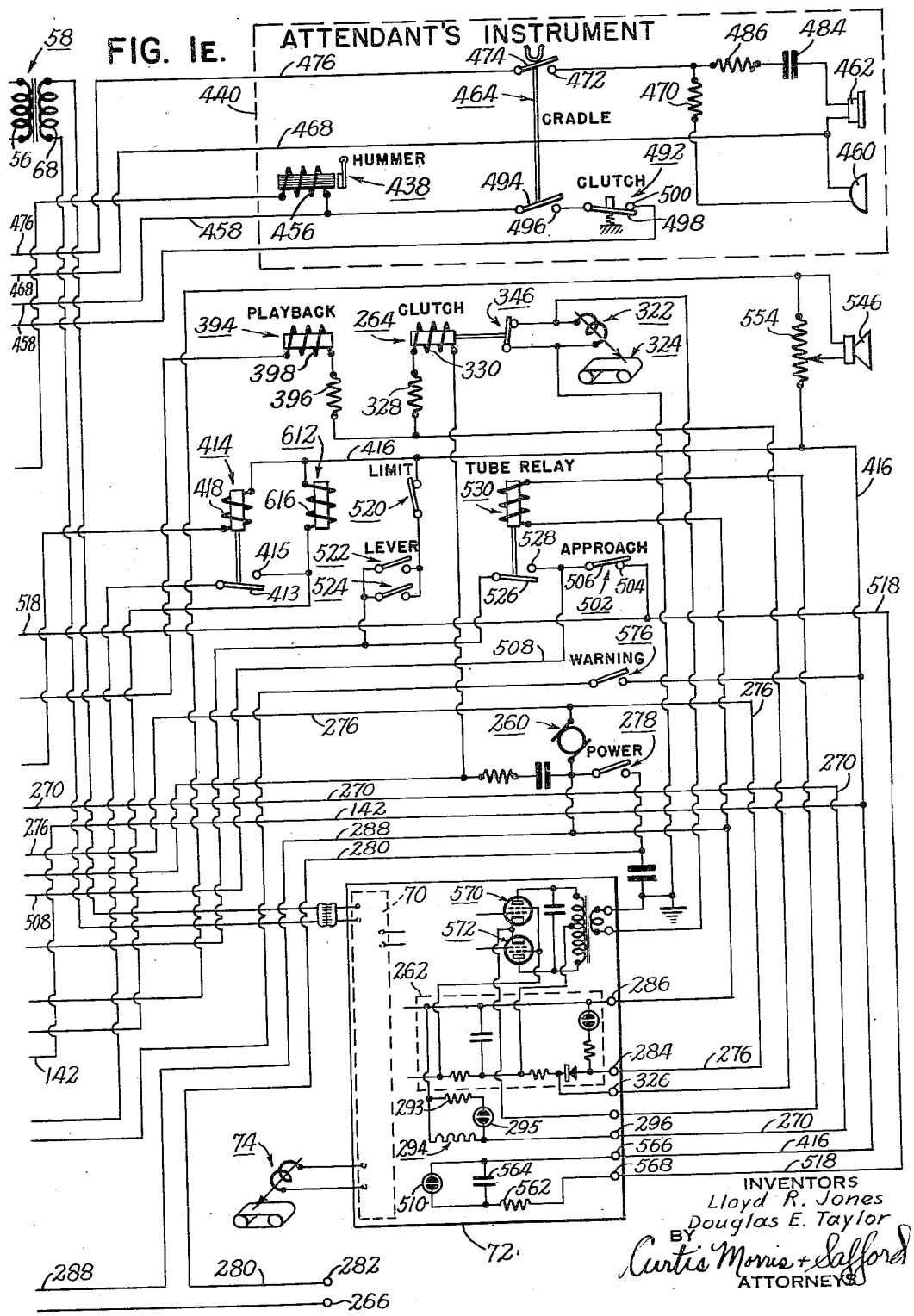

2,820,852

DICTATION SYSTEM

Lloyd R. Jones, Bridgeport, and Douglas E. Taylor, Westport, Conn., said Jones assignor to Dictaphone Corporation, Bridgeport, Conn., a corporation of New York Application September 20, 1954, Serial No. 457,165

22 Claims. (Cl. 179—100.1)

This invention relates to office-type dictation apparatus. More particularly, this invention relates to remotely-operated dictation systems wherein a number of dictation stations are connected to central recording apparatus; and represents a further improvement in such central dictation systems as are disclosed and claimed in U. S. patent applications Serial Nos. 250,122 and 279,744, filed, respectively, on October 6, 1951, and April 1, 1952, by D. E. Taylor and L. R. Jones as joint inventors. The description herein is directed primarily to improvements over these earlier systems; for detailed information on other parts of the system, reference is made to the above applications.

For proper operation of a remote dictation system, it is important that the dictator as well as the central station attendant be provided with suitable controls and indicating devices. For example, the dictator should be apprised when the system is ready for use, and should be provided with an exclusive channel when dictating. Further, it is important for the dictator to be able to play back a portion of the recording, when desired, and to make marks on an indicator slip at the central machine to identify corrections, instructions and ends of letters for use in transcription.

It also is desirable for the dictator to be able to signal and talk to the central station attendant. Additionally, the dictator should be given an indication when the record is nearly used up, and the attendant should be timely notified of such a condition so that the record can be exchanged for fresh media. Moreover, such control and indication functions as mentioned above should be accomplished by the fewest number of inter-office connections consistent with simple and economical circuitry.

Figure 1A:
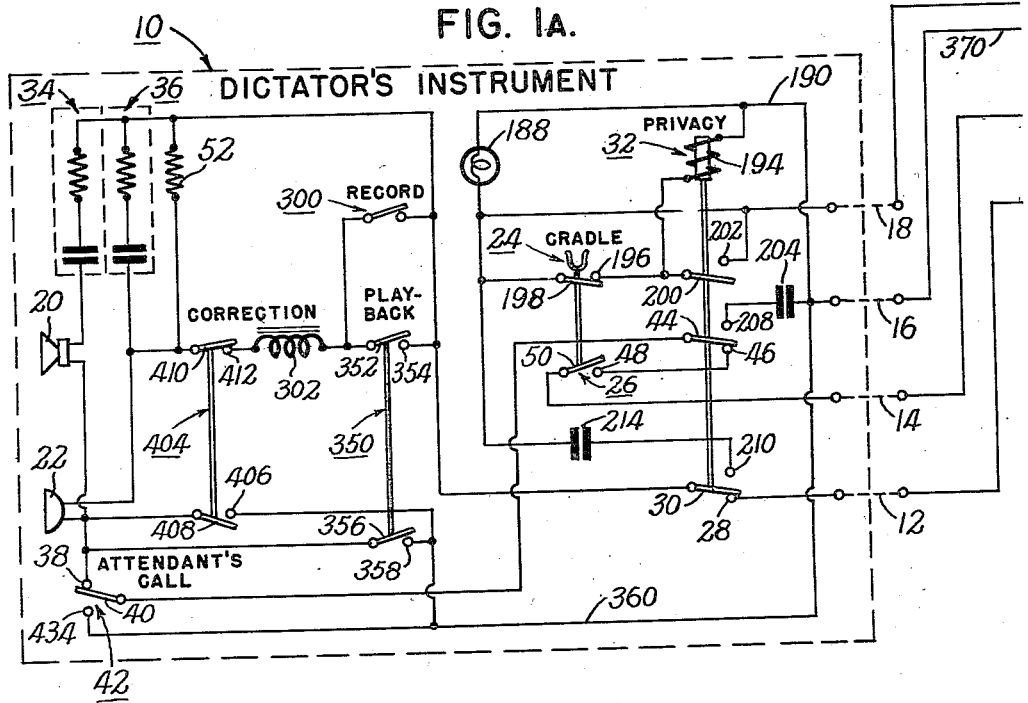
Figure 2:
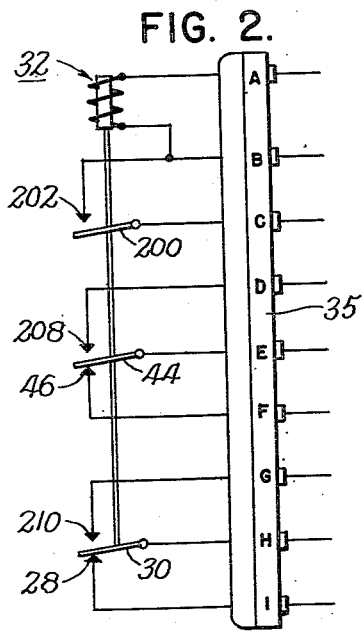
Figure 3:
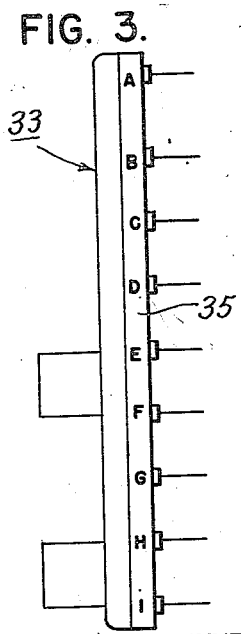
Figure 1D:
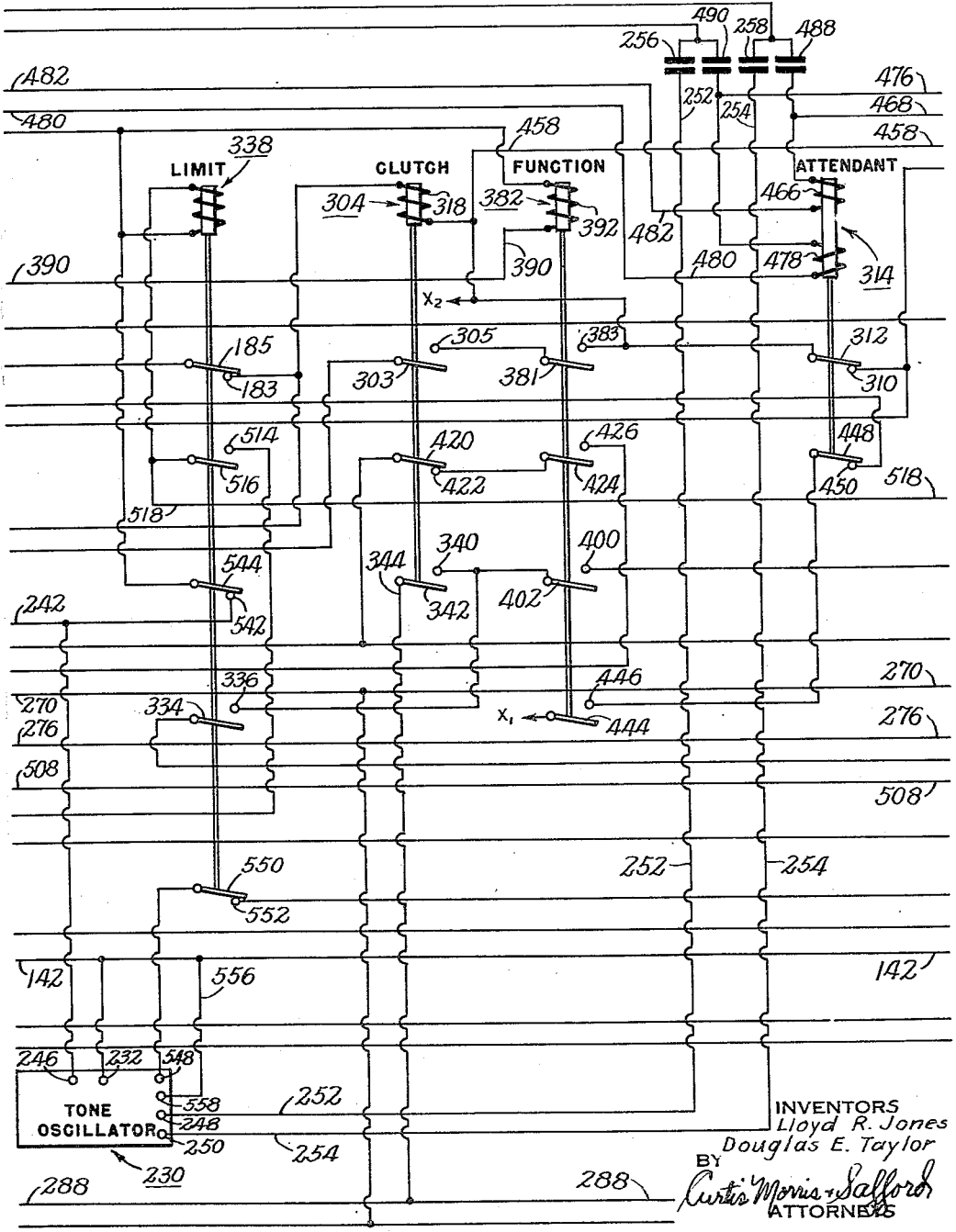

Accordingly, it is an object of this invention to provide a central dictation system that is superior to those used heretofore. It is a further object of this invention to provide a central dictation system wherein the required indicating and control functions are carried by a minimum number of inter-office connections. Other objects, aspects and advantages of the invention will be apparent from, or pointed out in, the following description of a preferred embodiment considered together with the accompanying drawings in which:

Figure 1 (comprising Figures 1a through 1e) is a partial schematic view of a centralized telephone-operated dictation system, particularly showing those circuits required to explain the principles of the present invention;

Figure 2 is a schematic view of the privacy relay used with the system of Figure 1, showing the plug-jack connection arrangement; and Figure 3 shows the dummy plug which may be substituted for the relay of Figure 2.

The apparatus in the broken line block 10 in the upper left hand corner of Figure 1a represents the equipment at one dictating station, it being understood that duplicates of this apparatus will be installed in each of the offices from which dictating is to be done. These other dictating stations will be connected in parallel through the inter-office lines 12, 14, 16 and 18 to the centrally-positioned control, recording and attendant's station apparatus, indicated diagrammatically on the remainder of Figures 1a through 1e. It may be noted that all of the various control relays, to be described in more detail hereinbelow, are shown in their deenergized condition.

To start dictation, with the system in "standby" condition (i. e. power supplies and amplifier filaments energized), the dictator lifts a telephone handset containing a receiver 20 and a transmitter 22, thereby opening one cradle-operated switch 24 and closing a second cradle-operated switch 26. This connects the microphone and the receiver to the inter-office lines 12 and 14, the path being traced from line 12 through a fixed contact 28 and movable arm 30 of a "privacy" relay 32, through a resistance-capacitance equalizing and D.-C. isolating network 34 and the receiver 20 (a parallel path being through a second resistance-capacitance network 36 and the transmitter 22), through one fixed contact 38 and a movable arm 40 of an "attendant's call" switch 42, through a movable arm 44 and a fixed contact 46 of the privacy relay 32, and through a fixed contact 48 and movable arm 50 of the cradle switch 26 back to the line 14. It should also be noted that, for purposes to be explained, a D.-C. path is completed between lines 12 and 14 through a resistor 52 bridged across the network 36; this resistor may have a value, for example, of about 4000 ohms.

One inter-office line 14 is connected through an isolating capacitor 54 directly to one end of a primary winding 56 of an audio transformer 58. The other line 12 is connected through an isolation capacitor 60, and through a fixed contact 62 and movable arm 64 of a pulse relay 66 to the other end of the primary winding 56. The secondary winding 68 of the transformer 58 is connected by a shielded cable to two terminals of the usual "record-reproduce" switch, indicated diagrammatically by the broken-line block 70, forming part of an amplifier assembly represented by a partial schematic diagram within the block 72. The audio signals thus fed into the amplifier assembly are amplified and recorded in the usual manner; the recording apparatus, being conventional, has been omitted from the drawing in order to simplify it. A reproducing head, generally indicated at 74, may be connected to the amplifier-assembly 72, through the switch 70, for play-back purposes as will be explained.

When lines 12 and 14 are connected together through the resistor 52, as mentioned above, current flows through the coils 80 and 82 of a line relay 84. The current path may be traced from line 12 through a lead 86 and one relay coil 82, through a lead 88 to the positive terminal 90 of a D.-C. power supply generally indicated by block 92 (and including, as do all of the D.-C. power supplies referred to below, the usual rectifying and filtering arrangements); from the negative terminal 94 of this power supply through a lead 96 and the other line relay coil 80, through a lead 100 to line 14, and back to line 12 through the resistor 52. Because resistor 52 has a relatively high ohmic resistance, the current flow is insufficient to energize the line relay 84. However, the resulting voltage drop across the relay coil 80 raises the potential of lead 100, and, through a lead 102, correspondingly raises the potential of the grid 104 of a triode tube 106. This tube 106 therefore starts to conduct and energizes a record relay 108, the current path being traced from the anode 110 of tube 106, through the record relay coil 112 to the positive terminal 114 of a D.-C. power supply generally indicated by block 118, and from the neutral terminal 116 of this power supply 118 to the cathode 120 of the tube 106. The negative terminal 122 of the power supply 118 is connected to the negative terminal 94 of power supply 92, to provide the grid 104 of tube 106 with a negative cut-off bias except when the line relay 34 is energized as explained above.

Energization of the record relay 108 momentarily short-circuits lines 12 and 14, the path being completed from line 12 through lead 86 and a lead 124, through a movable arm 126 and fixed contact 128 of the record relay, through a fixed contact 130 and movable arm 132 of an in-use relay 134, and back along leads 102 and 100 to line 14. This action shorts out the resistor 52, and connects the line relay coils 80 and 82 directly across the first power supply 92, thereby energizing the line relay 80.

Operation of the line relay 84 applies power to two in-use relays 134 and 136, the coils of which are in parallel. The energizing circuit may be traced from the negative terminal 138 of a D.-C. power supply generally indicated by block 140, along a lead 142, through a movable arm 144 and fixed contact 146 of the line relay 84, through the parallel coils 148 and 150 of the in-use relays 134 and 136, and back along a lead 152 to a positive terminal 154 of the power supply 140.

Energization of the first in-use relay 134 opens up its contacts 130 and 132, and hence removes the short-circuit between inter-office lines 12 and 14 so that the current through the line relay 84 drops back to its previously low value (but high enough to maintain the line relay actuated). Correspondingly, contacts 158 and 160 of the first in-use relay 134 open up to unshort a cathode biasing potentiometer 156, for the purpose of reducing the sensitivity of tube 106 so that it will cease conduction. That is, the resultant reduced current drain between terminals 116 and 122 of the power supply 118 causes the potential between these two terminals to increase (i. e. there is a lower drop across the power supply internal resistance). Hence, the cathode 120 is made more positive with respect to the grid 104, and tube 106 stops conduction and releases the record relay 108. An additional cathode biasing potentiometer 162 is connected in series with potentiometer 156; adjustment of these two potentiometers permits a proper setting of the cathode bias such that tube 106 will conduct and cease conduction under the conditions outlined above.

It may be noted that although power supply 118 has been shown as an integral unit, its operation may be more readily understod by considering it, in effect, as two power supplies with their outputs connected in series. That is, terminal 114 is more positive than terminal 116, and terminal 116 is more positive than terminal 122.

Operation of the second in-use relay 136 energizes a hold relay 164, the current path being traced from the negative terminal 138 of the power supply 140 to the lead 142, through a lead 166, a fixed contact 168 and movable arm 170 of the in-use relay 136, through a resistor 172 and winding 174 of the hold relay 164, and back through a lead 176 to the positive terminal 154 of the power supply 140. This, in turn, applies power to the inter-office lines 16 and 18, the path being completed from the negative terminal 178 of a power supply generally indicated by block 180 to line 16, and from line 18 through a fixed contact 182 and movable arm 184 of the hold relay 164, and thence to the positive terminal 186 of the power supply 180. The power on lines 16 and 18 energizes the dictator's instrument lamp 188 (at all dictator's stations) to indicate that the system is "busy," the circuit being completed from line 16, through a lead 190 and the lamp 188, and back through a lead 192 to line 18.

At the idle dictator's stations, the cradle switches 24 and 26 will be unoperated (i. e. in the position shown in the drawing). Hence, the power on lines 16 and 18 will operate the corresponding privacy relays 32 at these stations, the circuit being completed from line 16, through lead 190 and the privacy relay winding 194, through a fixed contact 196 and movable arm 198 of the upper cradle switch 24, and back through lead 192 to line 18. Once the privacy relay 32 has been energized, it cannot be deenergized by operating the cradle switch, since the relay energizing circuit is then also completed through a movable arm 200 and fixed contact 202 of the privacy relay. The "excluded" dictator cannot interfere with operation of the system, since opening of the privacy relay contacts 44 and 46 disconnects the receiver 20 and microphone 22 from the talking lines 12 and 14.

In addition, the "excluded" dictator will hear a humming tone in his receiver, caused by the ripple component produced on lines 16 and 18 by the rectifier power supply 180, to notify him that the system already is in use. This circuit may be traced from line 16 through a capacitor 204 and a fixed contact 208 and movable arm 44 of the privacy relay 32, through the attendant's call switch 42, the receiver 20, the equalizing network 34, through the movable arm 30 and a fixed contact 210 of the privacy relay, and back through a capacitor 214 and the lead 192 to line 18.

It has also been found advantageous to provide the privacy relay 32 as a separate plug-in unit, so that the dictation system may readily be transformed to nonexclusive operation. Figure 2 shows, schematically, such an arrangement wherein the relay terminals are connected to corresponding terminals of a plug-jack combination generaly indicated at 33. Figure 3 shows, schematically, a dummy plug 35 having suitable jumper connections such that, when it is substituted for the relay 32 in Figure 1, the dictation system will be rendered non-exclusive. In effect, this dummy plug 35 permanently closes the paths which, under the conditions outlined above, were completed through contact pairs 28–30 and 44–46 of the privacy relay 32, and permanently leaves open all other relay contact paths. Thus, when the dictator lifts up his handset, actuation of the cradle switch connects his telephone to lines 12 and 14 irrespective of whether a prior dictator is already connected to these lines.

Reverting now to Figure 1, the system also is arranged to provide a tone of short duration to the receiver of the telephone handset first picked up, to indicate to the dictator that he has taken control of the system. For this purpose, actuation of the second in-use relay 136 energizes a tone oscillator generally indicated by block 230, and which may be of any suitable type adapted to produce a signal, for example, of 1200 cycles per second. The energizing circuit for this oscillator 230 may be traced from its negative input terminal 232, through lead 142 to the negative terminal 138 of the power supply 140; from the positive terminal 154 of this power supply, along lead 176, through a fixed contact 234 and movable arm 236 of a tone relay 216, through a fixed contact 238 and movable arm 240 of the second in-use relay 136, and back along a lead 242 and a lead 244 to the positive input terminal 246 of the tone oscillator 230. The signal produced by the oscillator 230 is coupled from its output terminals 248 and 250, through two leads 252 and 254 and two isolation capacitors 256 and 258, to the lines 12 and 14, so that the dictator on picking up his handset will hear the tone and thus be notified that the system is ready for operation.

The tone relay 216 is maintained in energized condition (as long as the handsets are in their cradles) through a circuit which may be traced from the upper end of the tone relay winding 218, down through the lead 176 to the positive terminal 154 of the power supply 140, from the negative terminal 138 of the power supply to lead 142, and along a lead 220 through a fixed contact 222 and movable arm 224 of the hold relay 164 back to the lower end of the tone relay winding 218. The tone relay 216, of course, loses its energization when the hold relay 164 is actuated in response to the lifting of a handset, because of the opening of hold relay contacts 222 and 224. The tone relay is, however, of the "slow release" type (e. g. it may be provided with a copper slug in the heel end of the relay, and/or the relay winding may be bridged by a capacitor) which delays the opening of its contacts 234 and 236 a length of time (1–3 seconds) sufficient for the dictator to hear the signal under normal circumstances.

Actuation of the hold relay 164 also applies power to a recording machine drive motor 260, as well as to the rectifier power supply which is diagrammatically indicated in the amplifier assembly 72 by a broken-line block 262, and which provides D.-C. voltages for a clutch solenoid (to be described) and the anodes of the amplifier tubes (only partly shown). The power circuit for the drive motor 260 may be traced from one A.-C. input terminal 266, through a lead 268 and a lead 270 to a fixed contact 272 and movable arm 274 of the hold relay 164, through a lead 276 to the upper terminal of the motor 260, and from the lower motor terminal through an "on-off" power switch 278 and a lead 280 back to the other A.-C. input terminal 282. Current for the power supply 262 is provided by a connection from lead 276 to one power supply input terminal 284, the other input terminal 286 being connected by a lead 288 to the power switch 278 and thence back to the A.-C. terminal 282.

It may be noted that closure of the power switch 278 puts the system in "standby" condition with voltage supplied to the amplifier filaments and a primary winding 290 of a power transformer 292, the secondary windings of which furnish A.-C. voltage to the various relay power supplies partly described above. The filament power circuit may be traced from one A.-C. input terminal 282 through lead 280, through the power switch 278 and lead 288 to the amplifier power supply input terminal 286, which is connected internally of the amplifier 72 to one end of the series-connected filaments 294, from the filament terminal 296 back to lead 268 and the other A.-C. input terminal 266. The filaments 294 are bridged by a resistor 293 in series with an indicator lamp 295 which glows when the filaments are energized to indicate that the system has been placed in "standby" condition. The transformer power circuit is completed from the A.-C. input terminal 266 through the transformer primary winding 290 to lead 288, through the power switch 278 and lead 280 back to the first A.-C. input terminal 282.

Returning now to the operation of the system, when a person wishes to dictate, he presses a record switch 300, typically forming part of the telephone instrument, which shorts out the resistor 52 through an inductor 302. Inductor 302 (e. g. 150 millihenries) in combination with the resistor and capacitor (e. g. 47 ohms and 10 microfarads) of network 36, prevents the dictator from hearing a painful "click" on closing his record switch.

The short-circuit on resistor 52 increases the current through the line relay 84, which as explained above makes the grid 104 of tube 106 more positive. Tube 106 therefore conducts and energizes the record relay 108 as previously described. Operation of this latter relay supplies power to a clutch relay 304 through a circuit which can be traced from the negative terminal 178 of the power supply 180, through a fixed contact 306 and movable arm 308 of the record relay 108, through a fixed contact 310 and movable arm 312 of a normally-closed attendant's relay 314, through a lead 316 to one end of the clutch relay winding 318, and from the other end of this winding back along a lead 320 to the positive terminal 186 of the power supply 180.

Actuation of the clutch relay 304 in turn closes the power circuit to a clutch solenoid 264, and starts the recording head moving with respect to the record, both figuratively indicated at, respectively, 322 and 324. This circuit may be traced from a positive output terminal 326 of the amplifier rectifier power supply 262, through a resistor 328 and the clutch solenoid winding 330, along a lead 332, through a movable arm 334 and fixed contact 336 of a normally-energized limit relay 338, through a fixed contact 340 and movable arm 342 of the clutch relay 304, and along a lead 344 and lead 288 back to the negative terminal 286 of the amplifier power supply 262. Actuation of the clutch solenoid 264 also opens a switch 346 to remove a short circuit across the recording head coil thus placing the recording head into operative condition.

When the dictator desires to listen to a portion of the material already recorded, he closes a playback switch 350. One segment of this switch shorts out the resistor 52, through a movable arm 352 and fixed contact 354, and therefore energizes the clutch solenoid in a manner as explained above with reference to the record switch 300. The other segment of this switch 350 shorts together inter-office lines 14 and 16, the path going from line 14 through the movable arm 50 and fixed contact 48 of the cradle switch 26, through the fixed contact 46 and movable arm 44 of the privacy relay 32, through the movable arm 40 and fixed contact 38 of the attendant's call switch 42, through a movable arm 356 and fixed contact 358 of the lower playback switch segment, and back along a lead 360 to line 16.

Shorting lines 14 and 16 furnishes power to a control relay 362, the current path being completed from the positive terminal 364 of a D.-C. power supply generally indicated by block 366, along a lead 368 and lead 100 to line 14, through the closed circuit described above to line 16, along a lead 370, through a fixed contact 372 and movable arm 374 of the hold relay 164, through the winding 376 of the control relay 362, and back along a lead 378 to the negative terminal 380 of the power supply 366. Operation of the control relay 362 in turn energizes a function relay 382, the current path for this latter relay going from the negative terminal 138 of the power supply 140, along lead 142 and a lead 384, through a fixed contact 386 and movable arm 388 of the control relay, along a lead 390 through the function relay winding 392, and back through lead 176 to the positive terminal 154 of the power supply 140.

Energization of the function relay 382 applies power to a playback solenoid 394 which, by means not shown herein in order to simplify the disclosure, throws the "record-reproduce" switch 70 to its "reproduce" position. In the typical recording apparatus, a reproducing head (such as generally indicated at 74) engages the moving record a short distance behind the recording head, and when switch 70 is in its "reproduce" position, the amplifier circuitry is arranged so that the signal played back from the record by the reproducing head is amplified and coupled through lines 12 and 14 to the dictator's receiver 20. The energizing current path for the playback solenoid 394 may be traced from the positive terminal 326 of the amplifier power supply 262, through a resistor 396 and the playback solenoid winding 398, through a fixed contact 400 and movable arm 402 of the function relay 382, through the fixed contact 340 and movable arm 342 of the clutch relay 318, along leads 344 and 288 back to the negative terminal 286 of the amplifier power supply 262.

When the dictator releases his playback switch, it is possible for the clutch relay 304 to drop out before the function relay 382 is released. Since this might produce an undesired result, e. g. place a mark on the indicator pad at the recording machine, means are provided for locking the clutch relay in until the function relay has dropped out. This is accomplished through an energizing circuit which parallels contacts 306 and 308 of the record relay 108, and which can be traced from contact 306, through a movable arm 133 and fixed contact 135 of the first in-use relay 134, through a movable arm 303 and fixed contact 305 of the clutch relay 304, through a movable arm 381 and fixed contact 383 of the function relay 382, and thence along lead 316 back to the clutch relay winding 318.

When the dictator desires to make a correction mark, or such, on the indicator pad typically provided at the recording machine, he actuates the correction switch 404. The lower segment of this switch shorts out inter-office lines 14 and 16 through its fixed contact 406 and movable arm 408, in a manner similar to that explained above with reference to the playback switch 350, and, correspondingly, energizes the function relay 382. In the upper segment of the correction switch, a movable arm 410 is disengaged from its fixed contact 412, and thereby assures that operation of the record switch 300 or playback switch 350, either accidental or otherwise, will not short-circuit the resistor 52. Consequently, the clutch relay 318 and clutch solenoid 264 cannot be energized when the correction switch 404 is depressed.

Operation of the function relay 382, in combination with deenergization of the clutch relay 318, applies power to a marking relay 414 through a path which may be traced from the negative terminal 138 of the power supply 140, along lead 142 and a lead 416, through the marking relay winding 418, through a movable arm 420 and fixed contact 422 of the deenergized clutch relay 304, through a movable arm 424 and fixed contact 426 of the energized function relay 382, through a fixed contact 428 and movable arm 430 of the second in-use relay 136, and thence back to the positive terminal 432 of the power supply 140.

The marking relay 414, in turn, energizes a marking solenoid 612 through a circuit which can be traced from a positive terminal 613 of the power supply 140, through the relay contacts 413 and 415, through the solenoid winding 616, and back along leads 416 and 142 to the negative terminal 138 of the power supply 140. Actuation of the marking solenoid 612, through means not shown herein, places a mark on an indicator pad at the recording machine. As outlined in the above-mentioned U. S. patent application Serial No. 279,744, the relay 414 may be arranged so that its actuation also removes a motion-limiting latch from the solenoid 612 to permit a somewhat longer mark to be made on the pad than when the solenoid is energized (as will be explained) independently of the relay 414.

When the dictator desires to signal the attendant at the central station, he presses a button which transfers the movable arm 40 of the attendant's call switch 42 from the fixed contact 38 to a second fixed contact 434. This operation open-circuits lines 12 and 14 (since the conductive path previously passed through movable arm 40 and fixed contact 38 of switch 42) and at the same time closes a circuit from line 14 to line 16 in a manner similar to actuation of the correction switch 404 of the playback switch 350 as described above.

Opening the circuit between lines 12 and 14 in the dictator's instrument deenergizes the line relay 84, and the consequent opening of line relay contacts 144 and 146 deenergizes the in-use relays 134 and 136 and thereby removes power from the hold relay winding 174. The hold relay 164 is, however, a "slow release" type (e. g. a copper slug may be placed in the heel end of the relay, and a capacitor 175 may be connected in parallel with the relay winding 174), so that its contacts 372 and 374 remain closed for a short period of time (approximately 0.2 to 0.5 second). Thus, closing the circuit between lines 14 and 16 energizes the control relay 362 through the current path previously described. As soon as the control relay pulls in, power is again supplied to the hold relay (thus maintaining both the hold relay and the control relay energized) through a path which can be traced from the positive terminal 154 of the power supply 140, through lead 176 to the hold relay winding 174, through a resistor 172, through the movable arm 170 and a fixed contact 436 of the second in-use relay 136 (now deenergized), through the movable arm 388 and fixed contact 386 of the control relay 362, and back along leads 384 and 142 to the negative terminal 138 of the power supply 140.

Actuation of the control relay 362 in turn energizes the function relay 382 as previously described. The function relay, when the in-use relays are deenergized, completes a circuit to a "hummer" 438 (located at the attendant's instrument generally indicated by a block 440), which may be any one of a variety of devices capable of producing an audible signal when energized. The energizing circuit for the hummer 438 may be traced from a lead $X_1$ (which is connected to one end of a low-voltage, e. g. six volts, secondary winding 442 in the power transformer 292), through a movable arm 444 and fixed contact 446 of the function relay 382, through a movable arm 448 and a fixed contact 450 of the normally-closed attendant's relay 314, through a fixed contact 452 and movable arm 454 of the second in-use relay 136 (now deenergized), through the hummer winding 456, and back along a lead 458 to a lead $X_2$ (which is connected to the other end of the transformer secondary winding 442).

It will be apparent from the above description that whether the dictator obtains playback, a correction mark, or signals the attendant depends upon what combination of relays are energized along with the control relay 362. If the control relay is actuated before the desired combination is fully set up, an error may result, e. g. a correction mark may be obtained instead of playback. To avoid this possibility, the control relay advantageously is of the "slow operate" type (e. g. it may be provided with a copper slug in the armature end of the relay). Thus, there will be a small delay between energization and actuation (about 30 to 50 milliseconds) sufficient to assure that the proper combination of other relays is established before the control relay pulls in.

The attendant's instrument 440 is provided with a telephone handset including a microphone 460 and a receiver 462, through which the attendant is enabled to converse with the dictator to receive instructions, etc. When the hummer 438 sounds, the attendant picks up his handset, thereby actuating the attendant's cradle switch 464.

The upper segment of this cradle switch 464 energizes the attendant's relay 314, and also couples the attendant's telephone handset to the dictator's talking circuit. The relay power circuit may be traced from the upper end of one attendant's relay winding 466, along a lead 468, through the microphone 460 and a small resistor 470, through a fixed contact 472 and movable arm 474 of the cradle switch 464, along a lead 476, through the other attendant's relay winding 478, along a lead 480 to the negative terminal 94 of the power supply 92, and from the positive power supply terminal 90 along a lead 482 back to the lower end of the first attendant's relay winding 466. Closure of the upper segment of the cradle switch 464 places the microphone 460 (in series with the resistor 470) and the receiver 462 (in series with a capacitor 484 and a resistor 486) in parallel across the leads 468 and 476; these two leads, in turn, are coupled through respective capacitors 488 and 490 to the inter-office lines 12 and 14 to complete the dictator-to-attendant talking circuit.

Actuation of the attendant's relay 314 removes power from the hummer 438, by breaking the connection between movable arm 448 and fixed contact 450 of relay 314.

To insure that there is adequate line power for the dictator to talk to the attendant, it is desirable for the dictator to press his record switch 300 and thereby short out the series load presented by the resistor 52. Closure of this switch 300 also will actuate the clutch solenoid 264, even though energization of the attendant's relay 314 opens up the previously-described solenoid power circuit through attendant's relay contacts 310 and 312. This is because a parallel path around these contacts is provided from the lower end of the clutch relay winding 318, along lead 458, through a movable arm 494 and fixed contact 496 of the attendant's cradle switch 464, through a movable arm 498 and fixed contact 500 of an attendant's clutch switch 492, and thence back to the fixed contact 310 of the attendant's relay 314. If the dictator desires that the conversation not be recorded, the attendant merely presses his clutch switch 492 (which preferably is spring-closed) to open contacts 498 and 500, and thereby break the parallel clutch solenoid energizing circuit.

It may be desirable for the attendant to be notified when the dictator has finished dictating (i. e. hung up his handset) with only a few minutes time left on the record, so that fresh media can be placed on the machine. It also may be desirable to provide means for preventing any dictator from re-engaging the system when such little time is left on the record, since he might likely dictate to the end of the record without fully finishing his material, thus requiring an overlap between records. For this purpose, the recording machine carriage (not shown) is arranged to open an approach switch 502 when there is approximately two and one half minutes of time left on the record.

As long as the dictator's handset is out of its cradle, opening of this approach switch 502 has no effect. This is because the open contacts 504 and 506 of this switch are still connected together by a parallel path which can be traced through a lead 508, a movable arm 510 and fixed contact 512 of the (energized) hold relay 164, through a fixed contact 514 and movable arm 516 of the normally-energized limit relay 332, and back along a lead 518 to the movable arm 506 of the approach switch 502. However, if the dictator hangs up while in the "approach zone" (i. e. while the approach switch is open), the consequent deenergization of the hold relay 164 will break this parallel circuit through hold relay contacts 510 and 512, and thereby deenergize the limit relay 338.

The limit relay, which is normally energized, receives its power from a circuit which can be traced from the negative terminal 138 of the power supply 140, along leads 142 and 416, through a limit switch 520, through one of two lever switches 522 and 524, through a movable arm 526 and fixed contact 528 of a normally-energized tube relay 530, through the fixed contact 504 and movable arm 506 of the approach switch 502 (or through the parallel bridging path referred to above), along lead 518 to the limit relay winding 534, and from the other end of this winding back along lead 176 to the positive terminal 154 of the power supply 140.

When both the approach switch 502 and its parallel bridging circuit through the hold relay 164 are opened, as when the dictator hangs up with the carriage in the approach zone, the limit relay will lose power and drop out. If any dictator picks up his handset thereafter, the limit relay will not be reenergized, since the parallel path around the approach switch 502 is also broken by the opening of limit relay contacts 514 and 516. The limit relay may, of course, be reenergized by closing the approach switch 502, and means (not shown) may be provided for accomplishing this automatically if the attendant shifts the "record-reproduce" lever (not shown) at the central machine to its "reproduce" position.

As will be explained in more detail, deenergization of the limit relay 338 does the following: (1) places the recording machine in inoperative condition, (2) produces suitable indications at the attendant's station to notify him of the status of the machine, and (3) energizes the instrument lamp 188 at the dictator's stations to indicate that the system is not ready for use.

Opening of the limit relay contacts 334 and 336 breaks the power circuit (previously described) through which the clutch solenoid 264 is energized, thereby stopping movement of the record so that the machine is inoperative. The tone oscillator 230 is concurrently energized through a path which can be traced from the negative terminal 138 of the power supply 140, along lead 142 and a lead 540 to the negative input terminal 232 of the tone oscillator, from the oscillator positive input terminal 246 along lead 244, through a fixed contact 542 and movable arm 544 of the limit relay 338, and back along lead 176 to the positive terminal 154 of the power supply 140. Correspondingly, the signal produced by the tone oscillator is coupled to a loudspeaker 546 at the recording machine, this path being completed from one oscillator output terminal 548, through a movable arm 550 and fixed contact 552 of the limit relay 338 to one terminal of the loudspeaker 546 (which is connected between one end and the sliding contact of a volume-adjusting potentiometer 554), and from the other end of the potentiometer 554 back through leads 416 and 142 and a lead 556 to the other oscillator output terminal 558.

The tone produced by the loudspeaker 546 notifies the attendant that a recording machine is in need of attention. Since there may typically be a large number of recording machines at any one central installation, it also is desirable to furnish a light signal at the particular machine concerned so that the attendant can quickly identify that machine. A neon lamp 560 is provided for this purpose, and is energized through a series resistor 562 and a parallel capacitor 564 to cause it to flash periodically. The energizing circuit may be traced from one lamp input terminal 566, along lead 142 to the negative terminal 138 of the power supply 140, from the positive power supply terminal 154 through lead 176 to the limit relay winding 534, and from the other end of this winding along lead 518 to the other lamp input terminal 568. It may be noted that the neon lamp 560 is normally not energized because terminals 566 and 568 are shorted together through lead 416, limit switch 520, either one of the lever switches 522 and 524, tube relay contacts 526 and 528, and the approach switch 502.

Deenergization of the limit relay 338 also provides a parallel bridging path around the hold relay contacts 182 and 184 so as to maintain the instrument lamp 188 at the dictator station energized when the handset is hung up. This path may be traced from hold relay contact 184, through lead 320, through a fixed contact 183 and movable arm 185 of the limit relay 338, and back to hold relay contact 182.

Reverting now to the power circuit for the limit relay 338, it will be apparent that this circuit also will be broken if the limit switch 520 is opened, or if both of the lever switches 522 and 524 are opened, or if the tube relay contacts 526 and 528 are opened, and that the operations discussed immediately above will consequently occur under any of these conditions. The limit switch 520 is opened by motion of the recording machine carriage when it has reached the end of its travel. The lever switches 522 and 524 are controlled by the usual "record-reproduce" lever (not shown) at the central machine in such a way that one will be closed when this lever is in "record" position, the other will be closed when the lever is in "reproduce" position, and both will be open when the lever is in "neutral" position (as when the record is being changed).

The tube relay 530 is connected in series with the cathodes of two tubes 570 and 572 in the final stage of amplification, and the flow of plate current through these tubes maintains the tube relay normally energized. Should any of the amplifier filaments fail (which would automatically deenergize the series-connected filaments of tubes 570 and 572), or should the amplifier not be warmed up, the tube relay 530 will be deenergized.

Since as explained above plate voltage is not supplied to the amplifier tubes when all the handsets are hung up, to prevent the consequent deenergization of the tube relay 530 from deenergizing the limit relay and illuminating the dictator's busy lamps in this situation, the tube relay contacts 526 and 528 are provided with a parallel bridging path from contact 528 along lead 508, through the movable arm 510 and fixed contact 574 of the hold relay, and back to the other tube relay contact

526. Thus, the limit relay will be energized through the deenergized hold relay. Should any dictator pick up his handset, the limit relay will be maintained in energized condition through the tube relay contacts 526 and 528, unless for some reason there is a failure of plate current through the final amplifier tubes 570 and 572.

If the dictator has dictated a substantial time in the approach zone without hanging up, it is desirable to provide him with a warning indication that the end of the record is near. Accordingly, when there is about 30 to 60 seconds of time left on the record, the machine carriage closes a warning switch 576 which completes the power circuit to a pulse generator generally indicated in block form at 578. This generator may be of the multivibrator type such as disclosed in the above-mentioned U. S. patent application Serial No. 279,744, and produces short periodically spaced pulses between two output terminals 580 and 582. These pulses may, for example, have a duration of about 0.2 second, with a time between pulses of about 1.8 seconds. The energizing circuit for this generator 578 may be traced from the negative terminal 138 of the power supply 140, along leads 142 and 416, through the warning switch 576 to one input terminal 584, and from the other input terminal 586 to a positive terminal 588 of the power supply 140.

The pulses appearing on the output terminals 580 and 582 periodically energize the pulse relay 66, the path going from one terminal 580 through a movable arm 590 and fixed contact 592, of the first in-use relay 134, through the pulse relay winding 594, and back to the other terminal 582.

The pulse relay 66, in turn, periodically energizes the tone oscillator 230 through a circuit which may be traced from positive terminal 154 of the power supply 140, through a fixed contact 596 and movable arm 598 of the pulse relay 66, along leads 242 and 244 to the oscillator terminal 246, and from the other oscillator terminal 232 through lead 142 to the negative terminal 138 of the power supply 140. As mentioned before, the tone oscillator signal (in this case, a periodic "beep") is coupled from its output terminals 248 and 250 to the inter-office lines 12 and 14 and from there to the dictator's receiver 20. The pulse relay also is arranged to "blank" the recording machine during each beep, to prevent the tone signal from being recorded. This is accomplished by short-circuiting the audio transformer primary winding 56, the path going from the lower end of this winding, along a lead 600, through a fixed contact 602 and the movable arm 64 of the pulse relay 66, and thence back to the other end of the audio transformer primary winding 56.

Means also are provided to enable the dictator to place an "end-of-letter" mark on the indicator pad at the recording machine by either hanging up his handset or manually operating his cradle switch. During dictation, energization of the hold relay 164 closes a circuit which charges a capacitor 604; this circuit can be traced from the positive terminal 154 of the power supply 140, through lead 176, a resistor 606, a fixed contact 608 and movable arm 610 of the hold relay 164 to one plate of the capacitor 604, and from the other capacitor plate through lead 142 back to the negative power supply terminal 138. When the dictator hangs up, thus deenergizing hold relay 164, the capacitor 604 discharges through the marking solenoid 612, the current path going from hold relay movable arm 610 through a second fixed contact 614 to the solenoid winding 616, and back along leads 416 and 142 to the other end of the capacitor 604. As mentioned previously, this marking solenoid 612 may be provided with a motion-limiting latch controlled by the marking relay 414. When solenoid 612 is energized by the capacitor 604, this latch remains in place (since marking relay 414 will not be energized), and hence the solenoid movement will produce a relatively short mark on the indicator pad. By this means, the secretary transcribing the dictated material is enabled to distinguish the "end-of-letter" mark from the longer "correction" mark.

Accordingly, it will be apparent that the apparatus disclosed herein achieves the several objects set forth above. Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as to meet the requirements of particular applications, it being understood that various modifications may be made without departing from the scope of the invention as limited by the prior art.

We claim:

1. For use with a remotely-operated dictation system which includes centrally located recording and control apparatus wherein a recording head is arranged for relative traveling movement with respect to a record medium, said system also including a plurality of dictator's stations any one of which may be coupled to said recording head to transmit sound signals thereto for recording on said record medium, apparatus for enabling a plurality of control function signals to be transmitted over a minimum number of interconnecting lines and comprising, in combination, a plurality of dictator's instruments each including a microphone and a receiver, a control circuit for connecting said instruments to said recording and control apparatus, power supply means for producing current flow in said control circuit, control means associated with each of said instruments for selectively setting in discrete steps the magnitude of current flow through said control circuit such that a plurality of current conditions may be established therein, current-energizable means associated with said control circuit and actuatable by the current flowing therein when one of said current conditions is established but not actuatable by the current flowing therein when other of said current conditions are established, the current flow in said other conditions being of a lower magnitude than the current flow in said one condition, operating means under the control of said current-energizable means and arranged to be activated when one of said other current conditions is established and to subsequently actuate said current-energizable means by increasing the flow of current therethrough, and means responsive to the actuation of said current-energizable means for changing the sensitivity of said operating means so as to deactivate said operating means and thereby reestablish said other current condition in said control circuit, whereby said operating means is made available for future activation and consequent operation of a predetermined control function when said one current condition is established in said control circuit by said control means.

2. For use with a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus for selectively relaying any one of a plurality of control function signals over a minimum number of interconnecting lines and comprising, in combination, a plurality of dictator's instruments each including a microphone and a receiver, a control circuit for connecting said instruments to said recording and control apparatus, power supply means for producing current flow in said control circuit, control means associated with each of said instruments for selectively setting in discrete steps the magnitude of current flow through said control circuit such that a plurality of current conditions may be established therein, current-energizable means associated with said control circuit and actuatable by the current flowing therein when one of said current conditions is established but not actuatable by the current flowing therein when other of said current conditions are established, the current flow in said other conditions being of a lower magnitude than the current flow in said one condition, operating means under the control of said current-energizable means and arranged to be activated when one of said other current conditions is established, means responsive to the activation of said operating means and arranged when actuated to increase the flow of current through said current-energizable means and thereby to actuate the same, said current-energizable means being arranged when actuated to establish a first predetermined control function for said dictation system, and means responsive to the actuation of said current-energizable means for changing the sensitivity of said operating means so as to deactivate said operating means and reestablish said other current condition in said control circuit, said current-energizable means being arranged to remain actuated when said other current condition is reestablished, whereby said operating means is made available for future activation and consequent operation of a second predetermined control function when said one current condition is established in said control circuit by said control means.

3. In a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus comprising, in combination, a plurality of dictator's instruments each including a microphone and a receiver, a control circuit for connecting said instruments to said recording and control apparatus, power supply means for producing current flow in said control circuit, control means associated with each of said instruments for selectively setting in discrete steps the magnitude of current flow through said control circuit such that a plurality of current conditions may be established therein, first relay means associated with said control circuit and actuatable by the current flowing therein when one of said current conditions is established but not actuatable by the current flowing therein when other of said current conditions are established, the current flow in said other conditions being of a lower magnitude than the current flow in said one condition, voltage-sensitive means connected to the winding of said first relay means and arranged to be activated by the change in potential of said first relay winding caused by the flow of current therethrough when one of said other current conditions is established, second relay means energizable in response to the activation of said voltage-sensitive means and arranged when energized to increase the flow of current through said first relay means by establishing said one current condition in said control circuit, said first relay means being arranged when energized to produce a first predetermined control function in said dictation system, and means responsive to the actuation of said first relay means for changing the sensitivity of said voltage-sensitive means so as to deactivate both said voltage-sensitive means and said second relay means and thereby reestablish said other current condition in said control circuit, said first relay means being adapted once energized to remain actuated by the flow of current therethrough in said other current condition, whereby said voltage-sensitive means is made available for future activation and consequent operation of a second predetermined control function when said one current condition is established in said control circuit by said control means.

4. In a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus comprising, in combination, a plurality of dictator's instruments each including a microphone and a receiver, a control circuit for connecting said instruments to said recording and control apparatus, power supply means for producing direct current flow in said control circuit, control means associated with each of said instruments for selectively setting in discrete steps the magnitude of current flow through said control circuit such that a plurality of current conditions may be established therein, first relay means associated with said control circuit and actuatable by the current flowing therein when one of said current conditions is established but not actuatable by the current flowing therein when other of said current conditions are established, the current flow in said other conditions being of a lower magnitude than the current flow in said one condition, a vacuum tube having a control grid connected to the winding of said first relay means, said tube being arranged to conduct current when the potential of said grid is raised by the flow of current through said winding when one of said other current conditions is established in said control circuit, second relay means energizable in response to the flow of current through said tube and arranged when actuated to establish said one current condition in said control circuit so as to energize said first relay means, said first relay means having a pair of contacts arranged when actuated to produce a first predetermined control function for said dictation system, and means responsive to the actuation of said first relay means and arranged to vary the grid bias on said tube so as to decrease the flow of current therethrough and correspondingly deenergize said second relay means, said first relay means being adapted once energized to remain actuated by the flow of current therethrough in said other current condition, whereby said tube is made available for future activation and consequent operation of a second predetermined control function when said one current condition is established in said control circuit by said control means.

5. In a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus comprising, in combination, a plurality of dictator's instruments each including a microphone and a receiver, a control circuit for connecting said instruments to said recording and control apparatus, power supply means for producing direct current flow in said control circuit, resistance means associated with each of said instruments to be connected in series with said control circuit, first switch means associated with each of said instruments and adapted when actuated to connect said resistance in series with said control circuit to produce therein a current flow of relatively low magnitude, second switch means associated with each of said instruments and adapted when actuated to short out said resistance means to increase the flow of current through said control circuit, current-energizable means associated with said control circuit and actuatable by the current flowing therein when said resistance means is shorted out but not actuatable by the current flowing therein when said resistance means is connected in series therewith, operating means under the control of said current-energizable means and arranged to be activated in response to the current flow therethrough when said resistance means is connected in series with said control circuit, said operating means being arranged when activated to short out said resistance means and thereby to actuate said current-energizable means by the increased flow of current therethrough, said current-energizable means being adapted when actuated to produce a first predetermined control function for said dictation system, and means responsive to the actuation of said current-energizable means for changing the sensitivity of said operating means so as to deactivate said operating means and remove the short circuit from said resistance means and thereby to reduce the flow of current through said current-energizable means, said current-energizable means being arranged after actuation to remain actuated with such reduced current flowing therethrough, whereby said operating means is made available for future activation and consequent operation of a second predetermined control function when said resistance means is again shorted out by actuation of said second switch means.

6. In a remotely-operated dictation system which includes a central recording machine having a recording head arranged for relative traveling movement with respect to a record medium, and wherein one of a plurality of dictator's stations is to be coupled exclusively to said recording head to transmit sound signals thereto for recording on said record medium, apparatus comprising, in combination, a plurality of dictator's instruments each including a microphone and a receiver, on-off switch means for each of said instruments, a communication circuit for connecting any one of said instruments to said recording machine when the corresponding on-off switch means is actuated, current-energizable means associated with each of said instruments and arranged when energized to interrupt the connection between said communication circuit and the corresponding instrument, a control circuit for furnishing power to said current-energizable means upon operation of any one of said on-off switch means, and means under the control of each of said on-off switch means to interrupt the connection between said control circuit and the corresponding current-energizable means upon operation of any one of said on-off switch means, whereby when the on-off switch means for one instrument is operated all of the current-energizable means will be actuated except at the said one instrument so that the said one instrument will have an exclusive channel to the recording machine through said communication circuit.

7. In a remotely-operated dictation system which includes a central recording machine having a recording head arranged for relative traveling movement with respect to a record medium, and wherein one of a plurality of dictator's stations is to be coupled exclusively to said recording head to transmit sound signals thereto for recording on said record medium, apparatus, comprising, in combination, a plurality of dictator's instruments each including a microphone and a receiver, on-off switch means for each of said instruments, a communication circuit for connecting any one of said instruments to said recording machine when the corresponding on-off switch means is actuated, a relay associated with each of said instruments and having a pair of contacts adapted when said relay is energized to interrupt the connection between said communication circuit and the corresponding instrument, a control circuit arranged for connection to said relays, power supply means for producing current in said control circuit, means arranged upon operation of any one of said on-off switch means to connect said power supply means to said control circuit and to cause a flow of current therein, and second switch means mechanically joined to and operable with each of said on-off switch means to interrupt the connection between said control circuit and the associated relay upon operation of any one of said on-off switch means, whereby when the on-off switch means for one instrument is operated all of the relays will be energized except the relay at the said one instrument so that the said one instrument will have an exclusive channel to the recording machine through said communication circuit.

8. In a remotely-operated dictation system which includes a central recording machine having a recording head arranged for relative traveling movement with respect to a record medium, and wherein one of a plurality of dictator's stations is to be coupled exclusively to said recording head to transmit sound signals thereto for recording on said record medium, apparatus comprising, in combination, a plurality of dictator's instruments each including a microphone and a receiver, on-off switch means for each of said instruments, a communication circuit for connecting any one of said instruments to said recording machine when the corresponding on-off switch means is actuated, a relay associated with each of said instruments and having a first pair of contacts arranged when said relay is energized to interrupt the connection between said communication circuit and the corresponding instrument, a control circuit for furnishing power to said relays upon operation of any one of said on-off switch means, means under the control of each of said on-off switch means to interrupt the connection between said control circuit and the corresponding relay upon operation of any one of said on-off switch means, a second pair of contacts for each of said relays and arranged when the corresponding relay is energized to by-pass said interrupting means to assure that said control circuit furnishes power to said relay, whereby when the on-off switch means for one instrument is operated all of the relays will be actuated except at the said one instrument so that the said one instrument will have an exclusive channel to the recording machine through said communication circuit and subsequent operation of any of the on-off switch means at other dictator's stations will not de-energize the corresponding relay to connect such station to the communication circuit.

9. In a remotely-operated dictation system which includes a central recording machine having a recording head arranged for relative traveling movement with respect to a record medium, and wherein one of a plurality of dictator's stations is to be coupled exclusively to said recording head to transmit sound signals thereto for recording on said record medium, apparatus comprising, in combination, a plurality of dictator's instruments each including a microphone and a receiver, on-off switch means for each of said instruments, a communication circuit for connecting said instruments to said recording machine when the corresponding on-off switch means is actuated, a relay arranged to be inserted into a jack associated with each of said instruments, said relay having a pair of contacts adapted when said relay is energized to interrupt the connection between said communication circuit and the corresponding instrument, a control circuit for furnishing power to said relay upon operation of any one of said on-off switch means, means under the control of each of said on-off switch means to interrupt the connection between said control circuit and the corresponding relay upon operation of any one of said on-off switch means, whereby when the on-off switch means for one instrument is operated all of the relays will be actuated except the relay at the said one instrument so that the said one instrument will have an exclusive channel to the recording machine through said communication circuit, and a dummy plug for said apparatus, said dummy plug being arranged to be inserted into said jack upon removal of said relay and having internal circuit connections for fixedly connecting said dictator's instrument through said on-off switch means to said communication circuit.

10. In a remotely-operated dictation system which includes a central recording machine having a recording head arranged for relative traveling movement with respect to a record medium, and wherein one of a plurality of dictator's stations is to be coupled exclusively to said recording head to transmit sound signals thereto for recording on said record medium, apparatus comprising, in combination, a plurality of dictator's instruments each including a microphone and a receiver, on-off switch means for each of said instruments, a communication circuit for connecting said instruments to said recording machine when the corresponding on-off switch means is actuated, a relay associated with each of said instruments and having a pair of contacts arranged when said relay is energized to interrupt the connection between said communication circuit and the corresponding instrument, a control circuit for energizing said relays upon operation of any one of said on-off switch means, rectifier power supply means connected to said control circuit to provide current thereto for the energization of said relays, means under the control of each of said on-off switch means to interrupt the connection between said control circuit and the corresponding relay upon operation of any one of said on-off switch means, whereby when the on-off switch means for one instrument is operated all of the relays will be actuated except the relay at the said one instrument so that the said one instrument will have an exclusive channel to the recording machine through said communication circuit, and a second pair of contacts for each of said relays, said second pair of contacts being arranged when the corresponding relay is energized to couple said control circuit to the corresponding instrument so that an excluded dictator will be provided with a warning tone caused by the ripple component produced by said rectifier power supply.

11. For use with a dictation system wherein voice signals are to be transmitted over a communication circuit for recording by a centrally-located machine, and wherein a plurality of system control functions may be operated remotely of said machine, apparatus comprising, in combination, a plurality of dictator's instruments each including a receiver and a transmitter, a recording machine having a recording head arranged for relative traveling movement with respect to a record medium adapted to record voice signals, circuit means for connecting said instruments to said recording machine, said receiver and said transmitter being coupled to said circuit means, switch means associated with each of said instruments for selectively establishing any one of a plurality of current conditions in said circuit means, current-energizable means connected to said circuit means and selectively actuatable in accordance with the current condition established in said circuit means by said switch means, means under the control of said current-energizable means for producing the desired one of said system control functions in accordance with the condition of said current-energizable means, inductive means connected in series with said switch means, and serially-connected resistive and capacitive means bridged across said series-connected switch means and inductor means, whereby the sound impulse created in said instrument receiver upon operation of said switch means is substantially reduced.

12. In a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus for enabling any dictator to chose any one of several available system control functions comprising, in combination, a plurality of dictator's instruments each including a microphone and a receiver, first, second and third electrically-conductive lines for connecting said instruments to said recording and control apparatus, power supply means for producing current flow through said lines, first manually-operable means at each one of said instruments for selectively controlling the current flow through said first and second lines such that a plurality of current conditions may be established therein, second manually-operable means at each of said instruments for selectively controlling the current flow through said second and third lines such that a plurality of current conditions may be established therein, and current-energizable means associated with said control apparatus and selectively responsive to any of the various combinations of current conditions established in said first, second and third lines by the selective operation of said first and second means, and means operable in accordance with the selective response of said current-energizable means and arranged to establish the desired system control function in said recording and control apparatus.

13. In a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus for producing any one of a plurality of system control functions comprising, in combination, a plurality of dictator's instruments each including a microphone and a receiver, first, second and third lines for connecting said instruments to said recording and control apparatus, said first and second lines serving as a communication circuit for coupling said microphones and receivers to said recording head, power supply means for producing current flow through said lines, first switch means at each one of said instruments for selectively controlling the current flow through said first and second lines such that a plurality of current conditions may be established therein, second switch means at each of said instruments for selectively controlling the current flow through said second and third lines such that a plurality of current conditions may be established therein, and a plurality of relays associated with said control apparatus and selectively energizable in response to the particular combination of current conditions established in said first, second and third lines in conformance with the selected positioning of said first and second switch means, and control means operable in accordance with the selective energization of said relays and arranged to accomplish the desired system control function in said recording and control apparatus.

14. In a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus for selectively establishing any one of a plurality of available system control functions and comprising, in combination, a plurality of dictator's instruments each including a microphone and a receiver, first, second and third lines for connecting said instruments to said recording and control apparatus, said first and second lines serving as a communication circuit between said instruments and said recording apparatus, power supply means for producing direct current flow through said lines, first manually-operable switch means at each one of said instruments for selectively controlling the current flow through said first and second lines such that any one of three current conditions may be established therein, second manually-operable switch means at each of said instruments for selectively controlling the current flow through said second and third lines such that either of two current conditions may be established therein, and relay means associated with said control apparatus and selectively energizable in accordance with any particular one of the six possible combinations of current conditions established in said first, second and third lines by the selective control of said first and second switch means, and control means associated with said recording apparatus and operable in accordance with the selective energization of said relay means, said control means being arranged to produce the desired system control function in said recording and control apparatus in conformance with the setting of said first and second switch means.

15. In a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus for selectively establishing any one of a plurality of available system control functions and comprising, in combination, a plurality of dictator's instruments each including a microphone and a receiver, first, second and third lines for connecting said instruments to said recording and control apparatus, said first and second lines serving as a communication circuit between said instruments and said recording apparatus, power supply means connected to said lines for producing direct current flow therethrough, resistance means associated with each of said instruments and adapted for connection to said first and second lines, first switch means at each one of said instruments for connecting said resistance means in series with said first and second lines to produce therein a current flow of relatively low magnitude, second switch means at each one of said instruments for shorting out said resistance means to produce in said first and second lines a current flow of relatively greater magnitude than when said resistance means is in series with said first and second lines, third switch means at each one of said instruments and arranged when actuated to short together said second and third lines to cause a flow of current therein, and current-energizable means in said control apparatus selectively responsive to any of the various combinations of current conditions established in said first, second and third lines by the selected positioning of said first, second and third switch means, and control means operable in accordance with the selective response of said current-energizable means and arranged to establish the desired system control function in said recording and control apparatus in conformance with the positioning of said first, second and third switch means.

16. In a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus for selectively establishing any one of a plurality of available system control functions and comprising, in combination, a plurality of dictator's instruments each including a microphone and a receiver, first, second, third and fourth lines for connecting said instruments to said recording and control apparatus, said first and second lines serving as a communication circuit between said instruments and said recording apparatus, power supply means for producing direct current flow through said lines, indicator lamp means at each one of said instruments and connectible to said third and fourth lines, said indicator lamp means being arranged upon energization of said third and fourth lines to provide a light signal at said instruments to indicate that the dictation system is in use, first manually-operable switch means at each one of said instruments for selectively controlling the direct current flow through said first and second lines such that a plurality of current conditions may be established therein, second manually-operable switch means at each of said instruments for selectively controlling the current flow through said second and third lines such that a plurality of current conditions may be established therein, and current-energizable means forming a part of said control apparatus and selectively responsive to any of the various combinations of current conditions established in said first, second and third lines by the selected positioning of said first and second switch means, said current-energizable means including means adapted when current flows through either said first and second lines or said second and third lines to energize said third and fourth lines and thereby to light said indicator lamp, and means operable in accordance with the selective response of said current-energizable means and arranged to establish the desired system control function in said recording and control apparatus.

17. In a remotely-operated dictation system which includes a central recording machine having a recording head arranged for relative traveling movement with respect to a record medium, and wherein one of a plurality of dictator's stations is to be coupled exclusively to said recording head to transmit sound signals thereto for recording on said record medium, apparatus comprising, in combination, a plurality of dictator's instruments each including a microphone and a receiver, on-off switch means for each of said instruments, a communication circuit for connecting any one of said instruments to said recording machine when the corresponding on-off switch means is actuated, a relay associated with each of said instruments and having a first pair of contacts arranged when said relay is energized to interrupt the connection between said communication circuit and the corresponding instrument, a control circuit for furnishing power to said relays upon operation of any one of said on-off switch means, means under the control of each of said on-off switch means to interrupt the connection between said control circuit and the corresponding relay upon operation of any one of said on-off switch means, a second pair of contacts for each of said relays and arranged when the corresponding relay is energized to by-pass said interrupting means to assure that said control circuit continues to furnish power to said relay, whereby when the on-off switch means for one instrument is operated all of the relays will be actuated except at the said one instrument so that the said one instrument will have an exclusive channel to the recording machine through said communication circuit and subsequent operation of any of the on-off switch means at other dictator's stations will not de-energize the corresponding relay to connect such station to the communication circuit, and indicating light means associated with said control circuit to indicate whether the dictation system is in use.

18. In a remotely-operated dictation system which includes a central recording machine having a recording head arranged for relative traveling movement with respect to a record medium, and wherein one of a plurality of dictator's stations is to be coupled exclusively to said recording head to transmit sound signals thereto for recording on said record medium, apparatus comprising, in combination, a plurality of dictator's instruments each including a microphone and a receiver, on-off switch means for each of said instruments, a communication circuit for connecting said instruments to said recording machine when the corresponding on-off switch means is actuated, a relay associated with each of said instruments and having a pair of contacts arranged when said relay is energized to interrupt the connection between said communication circuit and the corresponding instrument, a control circuit for energizing said relays upon operation of any one of said on-off switch means, rectifier power supply means connected to said control circuit to provide current thereto for the energization of said relays, means under the control of each of said on-off switch means to interrupt the connection between said control circuit and the corresponding relay upon operation of any one of said on-off switch means, whereby when the on-off switch means for one instrument is operated all of the relays will be actuated except the relay at the said one instrument so that the said one instrument will have an exclusive channel to the recording machine through said communication circuit, and a second pair of contacts for each of said relays, said second pair of contacts being arranged when the corresponding relay is energized to couple the corresponding instrument to a source of tone signals so that an excluded dictator will be provided with a warning tone to indicate that the dictation system is in use.

19. For use with a dictation system wherein voice signals are to be transmitted over a communication circuit for recording by a centrally-located machine, and wherein a plurality of system control functions may be operated remotely of said machine, apparatus comprising, in combination, a plurality of dictator's instruments each including a receiver and a transmitter, a recording machine having a recording head arranged for relative traveling movement with respect to a record medium adapted to record voice signals, circuit means for connecting said instruments to said recording machine, said receiver and said transmitter being coupled to said circuit means, switch means associated with each of said instruments for selectively establishing any one of a plurality of current conditions in said circuit means, current-energizable means connected to said circuit means and selectively actuatable in accordance with the current condition established in said circuit means by said switch means, means under the control of said current-energizable means for producing the desired one of said system control functions in accordance with the condition of said current-energizable means, inductive means connected in series with said switch means, capacitive means bridged across said series-connected switch means and inductor means, and resistance means conneced in series with the circuit formed by said inductor and capacitive means, whereby the sound impulse created in said instrument receiver upon operation of said switch means is substantially reduced.

20. In a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus for enabling any dictator to choose any one of several available system control functions comprising, in combination, a plurality of dictator's instruments each including a microphone and a receiver, first, second and third electrically-conductive lines for connecting said instruments to said recording and control apparatus, power supply means for producing current flow through said lines, a plurality of switches interconnected with said first, second, and third lines for controlling the current flow through said lines such that a plurality of current conditions may selectively be established therein, a plurality of manually-operable mechanisms associated with said switches and arranged in such a manner that actuation of any one of said mechanisms will operate a predetermined combination of said switches and establish a corresponding combination of current flow conditions in said first, second and third lines, current-energizable means associated with said control apparatus and selectively responsive to any of the various combinations of current conditions established in said first, second and third lines by the selective operation of said switches, and means operable in accordance with the selective response of said current-energizable means and arranged to establish the desired system control function in said recording and control apparatus.

21. In a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus for selectively establishing any one of a plurality of available system control functions and comprising, in combination, a plurality of dictator's instruments each including a microphone and a receiver, first, second and third lines for connecting said instruments to said recording and control apparatus, said first and second lines serving as a communication circuit between said instruments and said recording apparatus, power supply means for producing direct current flow through said lines, first manually-operable switch means including a plurality of separate switches at each one of said instruments for selectively controlling the current flow through said first and second lines such that any one of three current conditions may be established therein, second manually-operable switch means at each of said instruments for selectively controlling the current flow through said second and third lines such that either of two current conditions may be established therein, a plurality of manually-operable mechanisms interlinked with said first and second switch means and arranged in such a manner that actuation of any one of said mechanisms will operate a predetermined combination of the switches and establish a corresponding combination of current flow conditions in said first, second and third lines, relay means associated with said control apparatus and selectively energizable in accordance with any particular one of the six possible combinations of current conditions established in said first, second and third lines by the selective control of said first and second switch means, and control means associated with said recording apparatus and operable in accordance with the selective energization of said relay means, said control means being arranged to produce the desired system control function in said recording and control apparatus in conformance with the operation of said first and second switch means by the selected one of said manually-operable mechanisms.

22. In a remotely-operated dictation system which includes central control and recording apparatus having a recording head arranged for relative traveling movement with respect to a record medium, and wherein one of a plurality of dictator's stations is to be coupled to said recording head to transmit sound signals thereto for recording on said record medium, apparatus for selectively establishing any one of a plurality of available system control functions and comprising, in combination, a plurality of dictator's instruments each including a microphone and a receiver, first, second, third and fourth lines for connecting said instruments to said recording and control apparatus, said first and second lines serving as a communication circuit between said instruments and said recording apparatus, power supply means for producing current flow through said lines, indicator lamp means at each one of said instruments and connectible to said third and fourth lines, said indicator lamp means being arranged upon energization of said third and fourth lines to provide a light signal at said instruments to indicate whether the dictation system is in use, first switch means including a plurality of separate switches at each one of said instruments for selectively controlling the direct current flow through said first and second lines such that a plurality of current conditions may be established therein, second switch means at each of said instruments for selectively controlling the current flow through said second and third lines such that a plurality of current conditions may be established therein, a plurality of manually-operable mechanisms interlinked with said first and second switch means and arranged in such a manner that actuation of any one of said mechanisms will operate a predetermined combination of the switches and establish a corresponding combination of current flow conditions in said first, second and third lines, current-energizable means forming a part of said control apparatus and selectively responsive to any of the various combinations of current conditions established in said first, second and third lines by the positioning of said first and second switch means in accordance with the selective actuation of any one of said manually-operable mechanisms, said current-energizable means further including means adapted to control the energization of said third and fourth lines and said indicator lamp, and means operable in accordance with the selective response of said current-energizable means and arranged to establish the desired system control function in said recording and control apparatus.

References Cited in the file of this patent
UNITED STATES PATENTS

| 2,066,672 | Bernard et al. | Jan. 5, 1937 |
| 2,277,207 | Chenoweth et al. | Mar. 24, 1942 |
| 2,677,018 | Logan | Apr. 27, 1954 |
| 2,690,480 | Logan | Sept. 28, 1954 |